Patented Jan. 28, 1947

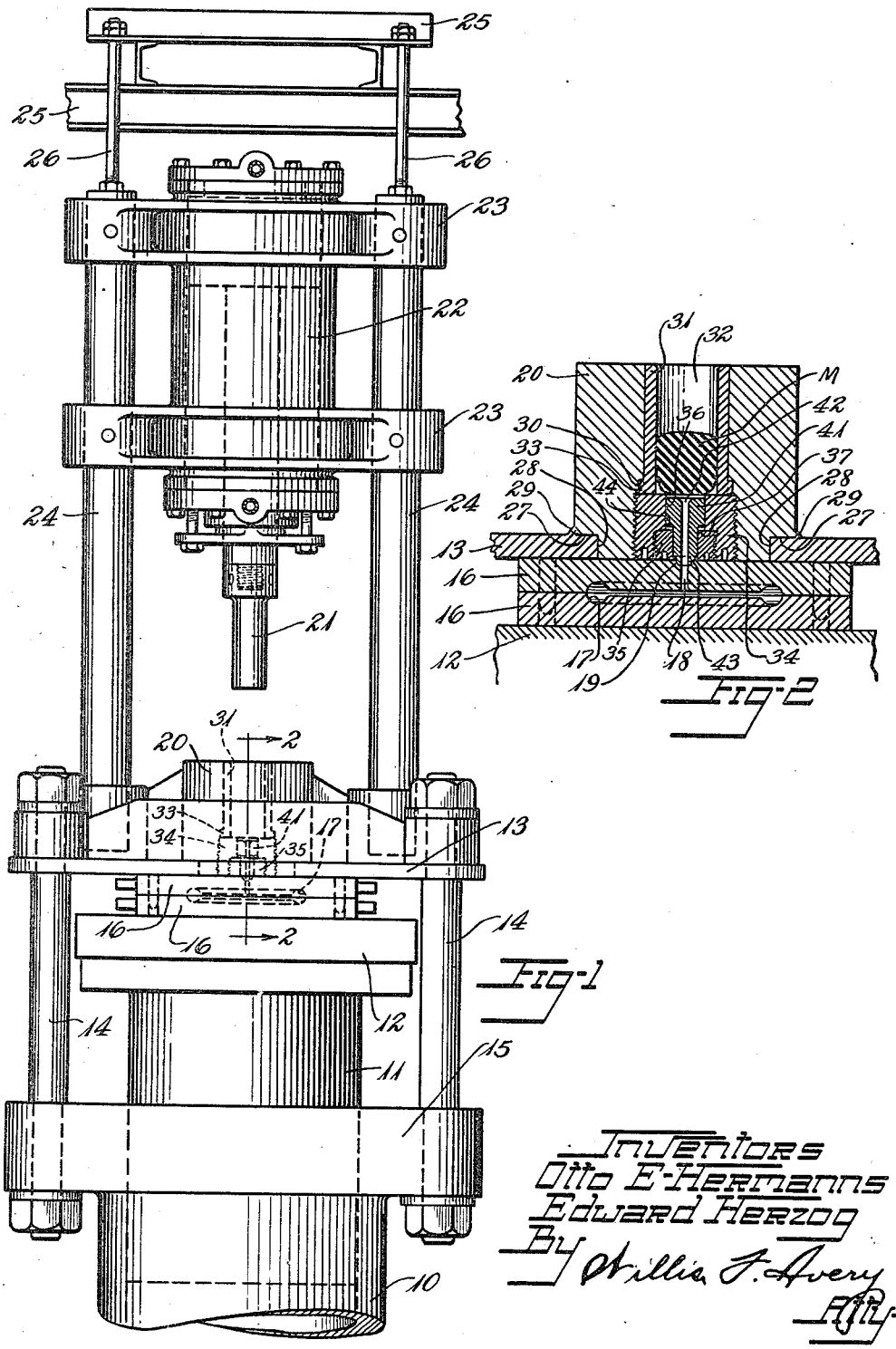

2,414,948

UNITED STATES PATENT OFFICE 2,414,948

MOLDING APPARATUS

Otto E. Hermanns, Akron, and Edward Herzog, Cuyahoga Falls, Ohio, assignors to The B. F. Goodrich Company, New York, N. Y., a corporation of New York Application March 27, 1944, Serial No. 528,233

8 Claims. (Cl. 18—30)

This invention relates to molding apparatus for use in making molded products from plastic moldable materials.

In molding operations, a separable cavitied mold may be held in a press and plastic moldable material, such as plasticized rubber, synthetic rubber, plasticized resins, or the like, forced from a nozzle into the mold cavity through a filling orifice in the mold structure. In the usual construction the nozzle is built into and is a part of the press structure. In such an apparatus the moldable material may escape at two places: where the nozzle engages the filling orifice and between the parts of the separable mold. In order to prevent such escape it is necessary that the pressure exerted by the nozzle on the mold be of equal magnitude with the pressure exerted by other parts of the press on the mold. Otherwise there will be too little pressure at one of the two places indicated above and the moldable material will escape. It is very difficult to obtain the necessary equal pressures in actual practice since even if the parts are correctly machined so that equalization of pressures is obtained at the outset it is still almost impossible to retain the desired condition after the parts have become worn by use.

It is therefore an object of this invention to provide an improved molding apparatus in which the nozzle is associated with the press structure but in which the above problem is eliminated, and generally to provide simple, economical and efficient molding apparatus.

Our invention comprises, broadly, apparatus for filling a cavitied mold having a filling orifice therein into which plastic moldable material is extruded, the apparatus comprising means engaging at least a portion of the surface of the mold surrounding the filling orifice for applying external pressure to the mold, and a nozzle built into the mold engaging means and having a floating nozzle member for engaging the filling orifice during the extrusion operation in such manner as to insure proper engagement between the nozzle and the mold under varying practical conditions and to minimize leakage of plastic material through imperfect engagement.

The invention will be described in greater detail as applied to a preferred embodiment shown in the accompanying drawing. Of the drawing, Fig. 1 is an elevation of an extrusion molding apparatus embodying this invention, and Fig. 2 is a sectional view taken along line 2—2 of Fig. 1.

The preferred apparatus illustrated in the drawing comprises a hydraulic press of usual construction including a hydraulic cylinder 10, a vertically reciprocable ram 11 which carries a movable lower platen 12, and a fixed upper platen 13 supported by four corner columns 14, 14 which extend upward from a base plate 15 carried by the cylinder 10.

By placing a mold on the lower platen 12 and raising the ram 11, the mold may be subjected to external pressure. Illustratively, the mold may be a split cavity mold comprising mold halves 16, 16 defining a mold cavity 17 and having a passageway 18 providing communication between the mold cavity and a conical depression 19 forming a filling orifice in the mold structure.

For filling the mold, a pressure pot 20 is mounted on the upper platen 13, the pot being adapted to receive extrudable plastic material and being provided with nozzle means hereinafter more fully described for conveying the extrudable material from the pot to the filling orifice of the mold.

For forcing the extrudable material from the pot, a vertically reciprocal plunger 21 is provided, the plunger being operable by hydraulic cylinder means 22 arranged in a vertical position over the pot 20. The hydraulic cylinder 22 may be supported by cross members 23, 23, secured to a pair of vertical columns 24, 24 extending upward from the top press platen 13. For added stability, the columns may be secured to ceiling beams 25, 25 by suitable rod means 26, 26.

The pot member 20 is set into a circular opening in the upper platen 13, a circumferentially recessed portion 27 at the bottom of the pot engaging the edges 28 of the circular opening and the lower face of the pot being flush with the lower face of the platen 13. For retaining the pot in position, the pot wall may be welded to the platen in a circumferential zone as indicated at 29, 29.

The pot member 20 is provided with a cylindrical bore extending vertically through the member, the bore being somewhat larger in the lower zone of the member to form a shoulder 30 at the juncture between the upper or small bore and the lower or large bore. The upper bore is provided with a hardened steel lining or bushing 31 providing a well 32 for receiving extrudable material. To keep the bushing from being forced upward by pressure of the plastic material under its lower edges during the extruding operation, a circumferential shoulder or integral collar 33 should be provided at the lower end of the bushing for locking engagement with the shoulder 30.

The lower or larger section of the bore is closed by a plug 34 having threaded engagement with the wall of the bore, the plug extending from the bottom of the well 32 to the bottom of the pot member and terminating flush with the lower faces of the pot member 20 and the platen 13.

The lower face of the plug 34 is likewise recessed and the recess is filled with a threaded plug 35 which terminates flush with the lower faces of the plug 34, the pot member 20, and the platen 13. Direct pressure contact is thus made with the mold 16 by each of these elements.

The plugs 34 and 35 are provided with aligned central bores forming a relatively large passageway 36 leading from the well 32 to the mold filling orifice 19, the bore in the plug 35 being somewhat smaller than the bore in the plug 34 to provide a circumferential shoulder 37 at the junction of the two bores.

The passageway 36 is occupied by a floating nozzle member 41 having a central passageway 42 extending axially through the member for conveying extruded material therethrough, the passageway 42 being relatively small as compared with the pasageway 36. The lower end of the nozzle member is provided with a projecting conical portion 43 adapted to engage the conical depression or filling opening 19 in the top of the mold, while the top end of the nozzle member is exposed to the extrudable material M contained in the well 32.

The nozzle member 41 has a cylindrical configuration conforming substantially to the configuration of the combined bores in the plugs 34 and 35 except that the upper or larger section of the nozzle member should be somewhat shorter than the depth of the corresponding plug bore, as shown, to provide for substantial free floating or sliding movement of the nozzle member 41 vertically within the passageway 36. The configuration of the floating nozzle member includes a circumferential shoulder 44 adapted to rest upon the shoulder 37 and so to prevent the nozzle member from dropping out of the passageway when the mold 16 is removed.

It will be understood that by removing the threaded plugs 34 and 35, the nozzle member 41 and the bushing 31 may be removed through the bottom of the pot structure for repair or replacement.

In operation, the mold 16 is positioned with the filling orifice 19 in alignment with the projecting portion 43 of the floating nozzle member 41 and a suitable quantity of extrudable material M is placed in the well 32. The ram 11 then is raised to bring the nozzle member into engagement with the mold, and to press the mold firmly between the two platens 12 and 13. The floating nozzle member 41 rides freely on the mold during the operation of closing the press and mold and so is enabled to adjust itself to varying mold conditions always encountered in using a series of different molds, however carefully they may be machined.

While maintaining on the mold a direct compressive pressure greater than that needed to force the extrudable material into the mold, the hydraulic means 22 is actuated to force the plunger 21 into the well 32. This action will subject the plastic material M to pressure which will be transmitted to the exposed head of the floating nozzle member 41 and so serve to force the member into close engagement with the mold orifice 19 under pressure at least equal to that exerted by the plastic material in flowing through the passageway 42. Desirably, the area of the exposed top head of the floating nozzle member 41 should be considerably greater than the projected area of the conical projection portion 43 of the nozzle in order that the effective total force tending to urge the nozzle member into engagement with the mold will substantially exceed the effective total force which might tend to urge it upward. Leakage of the plastic material at all points is thus minimized. The plunger pressure is maintained until the mold has been filled after which the plunger as well as the ram pressure may be released and the filled mold removed and carried elsewhere for further treatment such as heating to vulcanize the rubber. Alternatively, and especially when molding fast-setting materials, the mold may be jacketed for steam or otherwise heated to complete the vulcanization or similar treatment in the apparatus while the pressures are maintained. In either case, as soon as the operations have been completed the mold may be removed and another mold substituted in its place, thus providing for rapid and economical operations.

It will be appreciated that the external pressure holding the mold halves together is entirely independent from the pressure holding the floating nozzle in contact with the filling orifice of the mold so that the necessity for balancing these pressures is avoided and the danger of leakage is minimized at the joints between the mold parts as well as at the point of engagement between the nozzle and the mold filling orifice. Because of the self-adjusting character of the floating nozzle member, effective engagement with varying molds is assured and mechanical mold damage caused by a fixed nozzle improperly engaging the orifice, is eliminated.

Although the invention has been described in considerable detail with reference to a preferred embodiment illustrated in the drawing, it will be understood that numerous modifications and variations may be effected in such details without departing from the spirit and scope of the invention as defined in the appended claims.

We claim:

1. In an apparatus for extrusion filling of a cavitied mold having a filling opening therein, cylinder means adapted to contain a supply of extrudable material and having an outlet aperture therein, a nozzle member slidably mounted adjacent said outlet aperture for substantial movement with respect to the cylinder means in a direction generally axial of said outlet aperture and being adapted to engage the said filling opening for conveying extrudable material from the supply through the nozzle member to the mold, said nozzle member having a transverse surface exposed to the supply of extrudable material so that extrusion pressure on the material will force the nozzle member into engagement with the said filling opening, pressure of the extrudable material on said transverse surface being the sole means of forcing the nozzle into seating engagement with the filling opening, means for applying such extrusion pressure to the material, and means other than said nozzle member mounted in fixed relationship with said cylinder means for applying pressure directly to the exterior of said mold about said nozzle member.

2. Molding apparatus comprising a platen type press having upper and lower platens adapted to compress a mold therebetween, the upper platen having an aperture therein; a pressure pot mounted on the upper platen and having a lower portion extending through said aperture and terminating flush with the platen face for direct engagement with the mold, said pressure pot having a bore extending vertically therethrough; an annular plug partially closing the end of said bore adjacent the mold; a second annular plug partially closing the bore in the first said plug, said second plug extending only partially through the bore of the first plug so as to form a shoulder at its upper face; both said plugs being flush with the platen and lower face of the pot for direct engagement with the mold; an apertured nozzle member slidably mounted in the bores of the two said plugs, said nozzle member having a generally flat upper face terminating adjacent the top margin of the first said plug, a shoulder formed intermediate the ends of the member for motion-arresting engagement with the aforesaid shoulder formed by the second said plug, and a lower end adapted to engage a filling opening in the said mold; and means for forcing extrudable material from the pot through the said nozzle member into the mold; the arrangement being such that the nozzle member is forced into seating engagement with the mold filling opening solely by pressure of extrudable material acting on the aforesaid generally flat upper face of the nozzle member.

3. Molding apparatus comprising a platen type press having upper and lower platens adapted to compress a mold therebetween, a pressure pot securely mounted on the upper platen, said pressure pot having a vertical bore extending through the pot and the said upper platen, annular plug means partially closing the lower end of said bore, a floating nozzle member occupying the bore of said plug means and being slidably mounted therein for substantial movement longitudinally of the said bore between a position in which the nozzle member projects from the first said bore and a position in which the nozzle member is wholly within the first said bore, the lower end of said nozzle member being adapted to engage a filling opening in the said mold while the upper end of said member is exposed to extrudable material in the pressure pot, the nozzle member having a channel for conducting extrudable material therethrough, and means for forcing extrudable material from the pot through the said channel to the mold, the arrangement being such that the floating nozzle member is urged into seating engagement with the filling opening in the mold solely by pressure exerted on said floating member by the extrudable material.

4. Molding apparatus comprising a platen type press having upper and lower platens adapted to compress a mold therebetween, a pressure pot mounted over the upper platen and having nozzle means extending through the platen for conducting extrudable material from the pot to the mold, and a reciprocating plunger for forcing said material from the pot through the nozzle to the mold, said nozzle means comprising a floating member slidably mounted for substantial vertical movement between a position in which the nozzle member projects below the mold-contacting face of said upper platen and a position in which the nozzle member is wholly above the said face, the upper end of said floating member terminating short of the lowermost position of the said plunger and being normally separated therefrom by extrudable material in the pressure pot.

5. Molding apparatus comprising a split cavity mold having a filling opening in a face thereof, platen means independent of the mold for pressing the mold parts together, a cylinder for holding a charge of extrudable material, said cylinder having a discharge opening at one end thereof, means operable in said cylinder for forcing extrudable material therefrom through the said discharge opening, an apertured nozzle slidably mounted in said opening, said nozzle having a delivery portion normally projecting through said platen means for seating engagement with said filling opening in the said mold, the other end of said nozzle being exposed to extrudable material in the said cylinder, said nozzle being freely slideable between a normal operating position in which the nozzle projects through said platen means and an emergency position in which the nozzle does not so project.

6. Molding apparatus comprising a plural-part mold having a filling opening, means for clamping the parts of the mold in engagement with each other, a cylinder for holding a charge of extrudable material, said cylinder having a discharge opening at one end thereof, means operable in said cylinder for forcing extrudable material from said cylinder through said discharge opening, and an apertured nozzle slidably mounted in said discharge opening for free sliding movement between a position in which the nozzle projects from said cylinder and a position in which the nozzle does not project from said cylinder, said nozzle having a delivery portion adapted to seat in said filling opening of said mold and having a surface opposite to the delivery portion exposed to contact with the extrudable material in said cylinder, the arrangement being such that said nozzle is seated against said mold solely by pressure of extrudable material within said cylinder.

7. Extrusion apparatus for filling a mold and for similar purposes, said apparatus comprising a cylinder having a bore therein for holding a charge of extrudable material, a nozzle member for conducting said material from said cylinder to said mold, means for forcing said material from said cylinder through said nozzle, and mold-engaging means about said nozzle, said nozzle member being mounted for free sliding movement with respect to said cylinder between a position in which the nozzle member projects beyond said mold-engaging means toward said mold and a position in which the nozzle member does not so project.

8. Extrusion apparatus for filling a mold and for similar purposes; said apparatus comprising a cylinder having a bore therein for holding a charge of extrudable material; an annular plug partially closing an end of said bore; a second annular plug partially closing the bore in the first said plug, said second plug extending only partially through the bore of the first said plug so as to form a shoulder at its upper face; both said plugs being flush with an end of said cylinder for direct engagement with said mold; an apertured nozzle member slidably mounted in the bores of the two said plugs, said nozzle member having a generally flat face terminating adjacent the top margin of the first said plug, a shoulder formed intermediate the ends of the nozzle member for motion-arresting engagement with the aforesaid shoulder formed by the second said plug, and an end opposite said generally flat face adapted to engage a filling opening in the said mold; and means for forcing extrudable material from the cylinder through the said nozzle member into the mold; the arrangement being such that the nozzle member is forced into seating engagement with the mold filling opening solely by pressure of extrudable material acting on the aforesaid generally flat face of the nozzle member.

OTTO E. HERMANNS.
EDWARD HERZOG.